United States Patent [19]

Edsbäcker

[11] Patent Number: 4,481,582
[45] Date of Patent: Nov. 6, 1984

[54] METHOD AND APPARATUS FOR ENABLING THE TRACING OF ERRORS OCCURING IN A SERIES OF TRANSFERS OF BINARY MESSAGE WORDS

[75] Inventor: Carl P. T. Edsbäcker, Sollentuna, Sweden

[73] Assignee: Telefonaktiebolaget L M Ericsson, Stockholm, Sweden

[21] Appl. No.: 545,819

[22] Filed: Oct. 27, 1983

Related U.S. Application Data

[63] Continuation of Ser. No. 243,255, Mar. 12, 1981, abandoned.

[30] Foreign Application Priority Data

Mar. 24, 1980 [SE] Sweden ............................... 8002239

[51] Int. Cl.³ ............................................. G06F 11/10
[52] U.S. Cl. ...................................... 364/200; 371/29
[58] Field of Search .......................... 371/22, 32, 29; 364/200 MS File, 900 MS File

[56] References Cited

U.S. PATENT DOCUMENTS

| 3,810,119 | 5/1974 | Zieve et al. | 371/12 |
| 3,995,258 | 11/1976 | Barlow | 364/200 |
| 4,058,851 | 11/1977 | Scheuneman | 364/900 |
| 4,166,211 | 8/1979 | York et al. | 364/200 |
| 4,282,572 | 8/1981 | Moore et al. | 364/200 |
| 4,347,603 | 8/1982 | Jacob et al. | 371/32 |

OTHER PUBLICATIONS

Oliver, "Support Processor Error Recovery Mechanism", IBM Technical Disclosure Bulletin, vol. 20, No. 4, pp. 1362-1365, Sep. 1977.
Heimsoth, "On-Line", Error and Statistics Logging in Large Data Base Systems, IBM Tech. Disclosure Bulletin, vol. 19, No. 8, pp. 2874-2876, Jan. 1977.

Primary Examiner—Raulfe B. Zache
Assistant Examiner—David Y. Eng
Attorney, Agent, or Firm—Roberts, Spiecens & Cohen

[57] ABSTRACT

A method and apparatus for tracing errors during operation in progress in a sequence including a transfer series of binary message words between a plurality of electric circuits, which form a new message word from the obtained message word for transfer to the next circuit. The first message word in a sequence is provided with a marking word, and in each circuit the marking word is added to the new message word formed on the basis of the received message, and each message word is sensed during the transfer, the message word containing a marking word being copied into a memory. All message words provided with a given marking word are subsequently read out from the memory to determine whether the sequence of message words provided with the marking word is correct.

5 Claims, 1 Drawing Figure

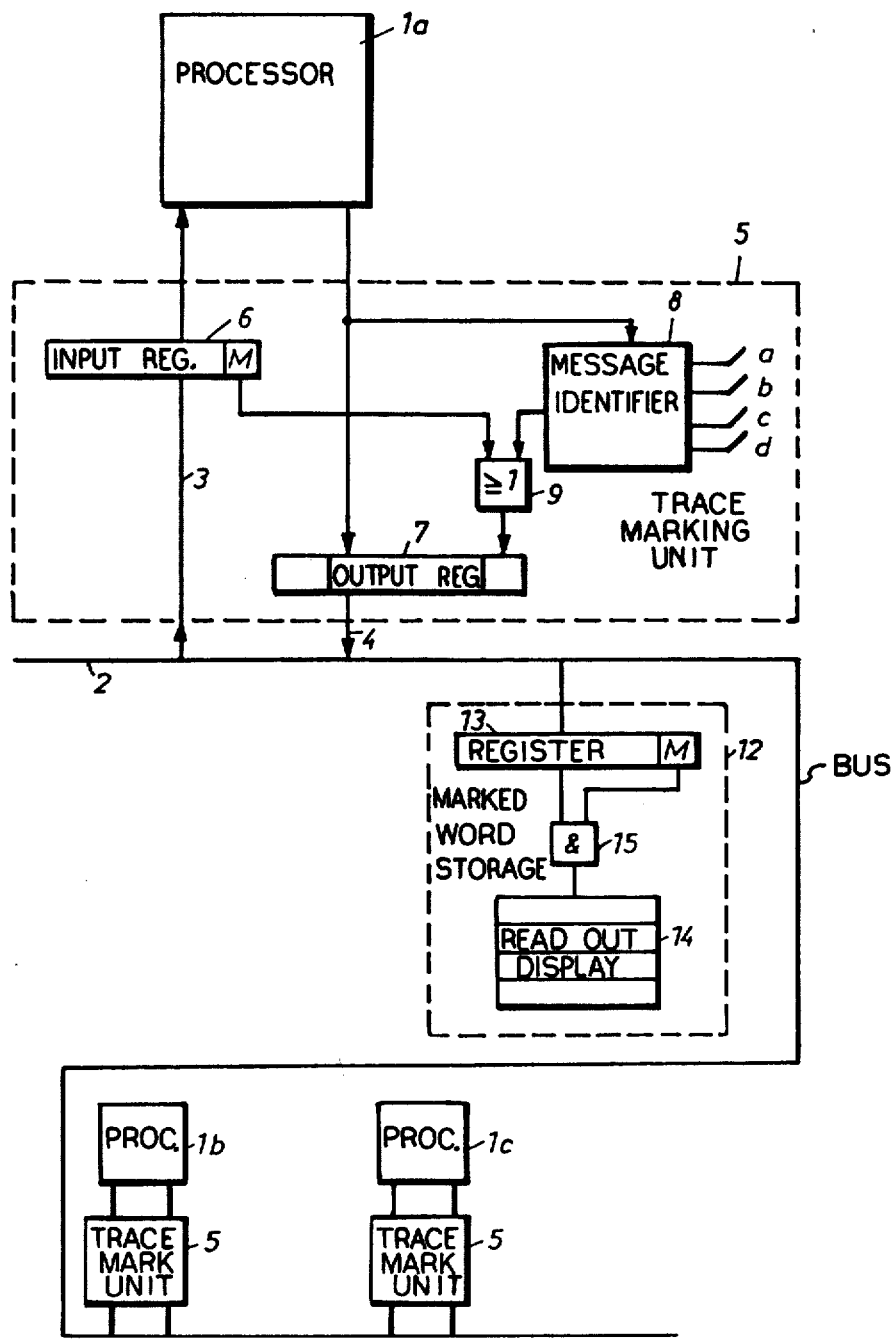

METHOD AND APPARATUS FOR ENABLING THE TRACING OF ERRORS OCCURING IN A SERIES OF TRANSFERS OF BINARY MESSAGE WORDS

This application is a continuation of earlier application Ser. No. 243,255 filed Mar. 12, 1981 and now abandoned.

FIELD OF THE INVENTION

The invention relates to a method of tracing errors during continuing operation in which there is a series of transfers of binary message words between a plurality of electric circuits, which form from the message word obtained a new message word for transmission to a subsequent circuit, e.g. data transmission between a plurality of processors. More particularly, the invention relates to the tracing of errors which may occur, for example, in a word contained in a group of words as the group of words is processed through a sequence of processors. The invention also relates to an apparatus for carrying out the method.

BACKGROUND

Different procedures can be utilized to trace errors in sequences of message words of the kind mentioned above. One possibility is to run the sequence it is desired to examine separately with the other sequences in the equipment being stopped during this time, all transmitted values are then registered and errors discovered by writing out and examining all messages in the examined sequence. In this case, the examination result can however be affected by all the other sequences normally progressing parallel thereto being inhibited during the test sequence, so that should an error in the examined sequence originate from the action of another sequence progressing parallel to it, it may happen that the check does not give any result.

Another possibility is to register and write out all sequences, the written-out list being visually examined. This method is very time-consuming, however.

SUMMARY OF THE INVENTION

An object of the invention is to eliminate above-mentioned disadvantages of the prior art and to provide a method by which an error in a sequence of the kind above can easily be traced, only messages in the examined sequence being registered without making necessary the inhibition of the sequences progressing parallel thereto during the period.

BRIEF DESCRIPTION OF DRAWING

The invention is described in greater detail below with reference to the accompanying drawing in which the sole FIGURE illustrates an apparatus for carrying out the method in accordance with the invention.

DETAILED DESCRIPTION

The sole FIGURE illustrates data processing equipment comprising a plurality of processors 1a, 1b, 1c, each of which is in communication with the other via an input 3 and output 4 coupled to a common bus system 2 along which messages can be transferred in either direction. Each processor is provided with a marking device 5 which is identical for all processors, but which is only shown in detail for the processor 1a. In order to simplify the description, the following qualifications are made:

a processor deals with only one task at a time
a processor and associated marking device 5 only senses the input 3 when the processor is free.

The processors together perform a variety of functions (computations). These functions are implemented by sequences of messages which are passed between the processors.

Each message contains, for example, one binary word. With each message word, there is associated a marking bit. The marking bit is normally set at zero. The marking bit is set at one for these messages words it is desired be stored for subsequent investigation. Between each message word in a sequence a time gap of varying length can appear. In these time gaps, message words belonging to other sequences can be tranferred between the processors.

The marking device 5 comprises an output register 7 connected into the outgoing line or output 4 and an input register 6 connected into the incoming line or input 3. Both registers are of such type that in addition to the bit positions for the message word which is to be passed on, they also contain at least one further bit position for one or more binary characters which are to be added to the message word, as explained hereinafter.

According to the example, it is desired to add a binary characteristic or marking bit to each word, within a sequence, that it is desired to trace. Should only one sequence be traced at the same time, it is sufficient to add one binary marking bit e.g. 1. On the other hand, if it is desired to trace several sequences simultaneously, the number of marking bits may be larger for enabling marking a plurality of sequences simultaneously in this way. This description only deals with the case of one marking bit.

In order to mark a first word in a certain sequence of message words, the message word which is transferred to the output register 7 is sensed. The desired sequence is identified by the fact that one message word in the sequence has a certain (known) value. The desired value of the message word is input (for example, manually be means of switches a–d) to the message identifier 8. The message identifier 8 compares the (manually) input word with the message word which is transferred from the processor 1a to the output register 7. Upon equality, a logical 1 is tranferred to the marking register 10 via OR-gate 9.

A read-out or storage device 12 is coupled to the transfer bus 2 and receives all message words transferred between all units connected to the bus, and together with their marking bits inputs these into register 13. If the message word is provided with a marking bit or bits, an AND-gate 15 is opened and the word written into a memory 14, so that all words provided with a marking bit can be read out at the termination of the sequence and checked as to whether they are correct or not.

With respect to receiving a word which is already provided with a marking bit in a processor and feeding out the word obtained by processing the obtained work, the output must be provided with the same marking bit. This is done in that the incoming word is written into the incoming register 6 where a special bit position is kept for a logical 1 functioning as a marking bit. From this position a signal is transferred to the output register 7 via the OR-gate 9 so that the latter is activated. In the same way as for an original marking, the OR-gate 9 adds a logical 1 to the word inserted in the out-put register 7, which is then a completely different word (i.e., it has been processed) from that obtained in the input. During the continued sequence, the new word is registered in the read-out device 12 which takes the new word appropriately marked from the bus. When the whole sequence of message words is terminated, the successively written-in words are read out and it will then be easy to verify (i.e., by visual inspection) the tested sequence and determine which words are incorrect. When the processor is free for new tasks, the entire input register 6 is first reset to zero along with registers 7, 10 and 16, whereafter the processors once again begin to pick up input signals from the bus.

What we claim is:

1. A method of enabling the following up of the development of an error in a computation sequence during an operation in progress, in which each computation gives a partial result, and the partial results taken together give a final result, and in which there is included a series of transfers of binary information words between a plurality of processing units which from a received information word a new information word is formed for transfer to a subsequent processing unit, said method comprising adding a marking label to an information word which initiates a computation sequence to be investigated, in each processing unit to which said labelled word is subsequently supplied, removing the label and storing the same and then adding the label to the resulting information word formed in the associated processing unit, sensing each information word transferred between the processing units and copying the labelled information words transferred between the processing units into a memory, and displaying said information words which have been copied in said memory whereby to enable determining whether the words in the sequence of labelled information are correct.

2. Apparatus for tracing errors in a computation sequence during an operation in progress, in which each computation gives a partial result, and the partial results taken together give a final result, and in which there is included a series of transfers of binary information words between stations in which from a received information word a new information word is formed for transfer to a subsequent station, said apparatus comprising a plurality of processing means constituting a sequence for the sequential processing of said binary information words, a bus to which said processing means are coupled for the transfer of said words, each said processing means (1a, 1b, 1c) including means (5) for supplying marking bits (M) to words supplied to the corresponding processing means and including an output register (7, 10) in which a word to be sent out from the associated processing means is stored before sending the same out together with at least one marking bit (M), said marking means (5) further comprising a identifier means (8) for identifying a word sent out from one of the processing means as a first word in a computation process to be investigated and supplying at least one marking bit to be added to said first word to said register (10), an input register (6, 16) in which incoming words from the said bus are stored, said input register being connected to said output register (7, 10) for appending, to a word formed from a received word by the associated processing means, a marking bit as previously appended to the corresponding incoming word, said apparatus further including a read-out means (12) connected to said bus for receiving all words therefrom, said read-out means including a memory means and identifying means (13, 15) for identifying words provided with marking bits for copying of the same into said memory means (14), and means for displaying words stored in said memory means.

3. Information word processing apparatus comprising a system bus and a plurality of word processing means connected to said system bus whereby information words can be transferred between said processing means, input means connecting said processing means to said system bus for permitting the transfer of information words from said system bus to said processing means, output means connecting said processing means to said system bus for permitting the transfer of information words from said processing means to said system bus, marking means for appending a marking word to an information word to be supplied from a processing means to said bus, first energizing means energizing said marking means when an information word supplied from the associated processing means comprises a predetermined binary information and second energizing means for energizing said marking means when the associated input means receives an information word to which has previously appended a marking word obtained from another processing means whereby the processed information word generated by the associated processing means in response to said received information word has appended thereto a marking word.

4. The apparatus of claim 3 further comprising storage means connected to said system bus for storing all information words to which there is appended a marking word and which appear on the said system bus and reading means for reading the words stored in said storage means.

5. The apparatus of claim 3, wherein said marking means can generate different marking words whereby different sets of information words can be identified.

* * * * *